June 26, 1956 D. G. MOORE 2,752,493
OSCILLATOR FREQUENCY STABILIZATION SYSTEM
Filed Jan. 22, 1954
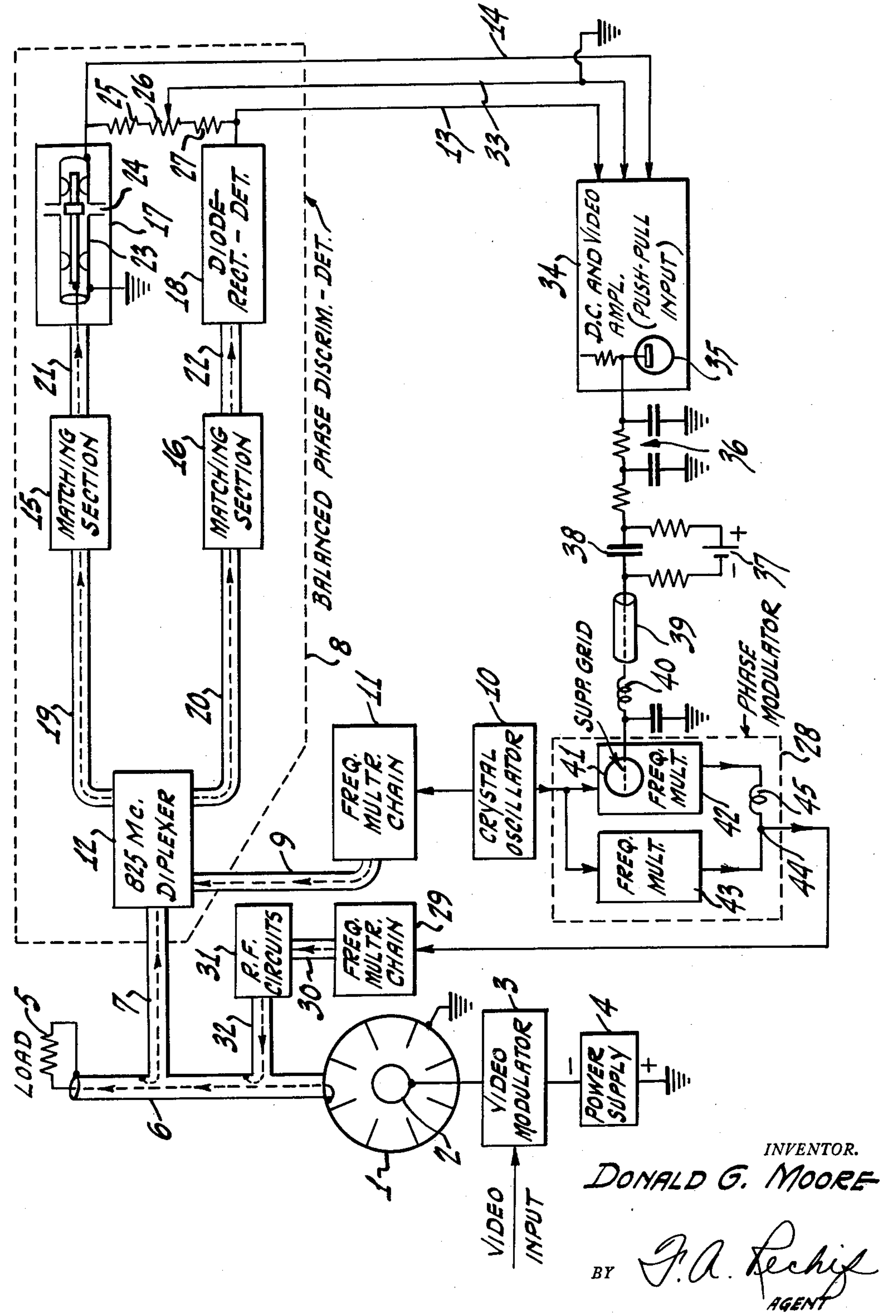
INVENTOR.
DONALD G. MOORE
BY F. A. Rechif
AGENT United States Patent Office 2,752,493

Patented June 26, 1956

2,752,493

OSCILLATOR FREQUENCY STABILIZATION SYSTEM

Donald G. Moore, Princeton, N. J., assignor to Radio Corporation of America, a corporation of Delaware Application January 22, 1954, Serial No. 405,588

11 Claims. (Cl. 250—36)

This invention relates to a frequency stabilization system for oscillators, and more particularly to a stabilization system for oscillators of the magnetron type. A stabilization system of this type operates to maintain the frequency of the controlled magnetron oscillator substantially exactly equal to that of a reference oscillator.

This invention constitutes an improvement over that disclosed in the copending Koros application, Serial No. 249,507, filed October 3, 1951, now Patent No. 2,691,140, which issued on October 5, 1954, and which is assigned to the same assignee as the present application. In said application, there is disclosed an injection locking system for the frequency and phase stabilization of an amplitude modulated magnetron oscillator. The locking signal (which is injected into the magnetron to stabilize its frequency) is angularly modulated in accordance with a signal derived from the oscillator output, in such a direction as to be degenerative, that is, so as to reduce the incidental phase modulation present on the oscillator output. The incidental phase modulation present on the oscillator output is detected by means of a phase detector or phase discriminator (coupled to the controlled oscillator and also to a reference signal source) the output of which, that is, the error signal, is coupled to a phase modulator in order to phase modulate the wave injected into the magnetron from a crystal-stabilized injection source.

It is quite necessary, in a system of the abovedescribed type, that the R. F. carrier of the controlled oscillator (magnetron) be approximately centered on the phase discriminator characteristic, for proper operation of the system including the phase discriminator. When the controlled oscillator is amplitude modulated and when a low final value of residual phase modulation is desired, the carrier centering becomes more critical. Thus, if the oscillator R. F. carrier is not roughly centered on the phase discriminator characteristic (which characteristic is a plot of the relation between the input phase angle to the phase discriminator and the output voltage therefrom), but has drifted considerably from the center point, the output voltage of the phase discriminator will not be of the proper relative polarity or magnitude, or both, to cause degeneration or reduction of the incidental phase modulation present on the oscillator output, when the phase discriminator output is used to phase modulate the locking signal fed into the magnetron oscillator. Also, it is necessary to keep the oscillator R. F. carrier approximately centered on the phase discriminator characteristic in order to reduce the effect on the discriminator output of the amplitude modulation present on the oscillator output (it will be remembered that the oscillator is amplitude modulated by a modulating signal). Both of the abovedescribed results of failure to keep the oscillator R. F. carrier approximately centered on the phase discriminator characteristic become more serious when high levels of amplitude modulation are used.

In injection locking systems, slow frequency drifts of the magnetron oscillator unavoidably occur from various causes, drifts which tend to shift the oscillator R. F. carrier considerably away from the center of the phase discriminator characteristic. These slow drifts produce D. C. components in the output of the phase discriminator. The system disclosed in the aforementioned Koros application, however, uses an A. C. coupling between the output of the phase discriminator or phase detector and the phase modulator, which coupling is inherently incapable of passing D. C. components. As a result, in the Koros system, which comprises several frequency multiplier stages, manual adjustment is necessary to maintain the oscillator R. F. carrier roughly centered on the phase discriminator characteristic, and in practice it was found that the required adjustment was continually changing, so that frequent manual adjustment was needed to maintain the required centering of the oscillator R. F. carrier. This frequent manual adjustment is inconvenient and bothersome. The use of the D. C. components to automatically counteract the effects of the slow frequency drifts of the magnetron oscillator, according to the present invention, overcomes the need for this manual adjustment.

An object of this invention, therefore, is to provide an arrangement for automatically maintaining the oscillator R. F. carrier approximately centered on the phase discriminator characteristic, in an injection locking system of the type previously described.

Another object is to perform the aforesaid object in a simple yet very effective and efficient manner.

The objects of this invention are accomplished, briefly, in the following manner:

In an oscillator frequency stabilization system wherein the oscillator frequency is primarily controlled by an injection locking process, with further stability added by phase modulation of the injection locking signal in response to phase modulation on the output of the oscillator, a D. C. coupling is used between the output of the phase discriminator or detector and the phase modulator, this coupling being capable of passing on to the phase modulator D. C. components appearing in the output of the phase discriminator, for counteracting the undesirable effects of slow frequency drifts of the controlled oscillator.

The foregoing and other objects of the invention will be better understood from the following description of an exemplification thereof, reference being had to the accompanying drawing, wherein the single figure is a schematic diagram of an arrangement according to this invention.

Now referring to the drawing, magnetron 1 (represented in more or less stylized form as having a cathode 2 surrounded by a plurality of radially-directed anode vanes) is anode modulated by means of an amplitude modulator 3 which is connected to cathode 2 and to which a suitable modulating signal, for example a video signal, is applied. The anode of magnetron 1 is grounded, as is the positive terminal of the power supply 4 the other (negative) terminal of which is connected through modulator 3 to cathode 2. Magnetron 1 is thus energized with such potential as to cause it to operate in a well-known manner to generate oscillatory energy of high carrier frequency which is modulated in amplitude by the video modulating signal applied to modulator 3.

Magnetron 1, which may operate at 825 mc. (megacycles), for example, feeds a suitable load 5, which may for exampe be a transmitting antenna, by means of a coaxial feed line 6. A small portion of the output of magnetron 1 is taken off by a coaxial transmission line 7 and fed as one of the inputs to a balanced phase discriminator-detector 8, enclosed in a dashed-line box. A reference signal, having a stable or fixed frequency and phase, is fed to the other input of discriminator 8 via a coaxial line 9. This reference signal is derived from a crystal oscillator 10 through a frequency multiplier chain 11 which multiplies the frequency of crystal 10 to an output frequency of 825 mc. at line 9. Thus, the two signals used for phase comparison in discriminator 8 have the same nominal frequency. The reference signal is derived from a low frequency crystal-stabilized oscillator 10 through the isolating frequency multiplier chain 11 to prevent the reference signal from being subject to any pulling effects when the oscillator 1 is amplitude modulated and in this way the oscillator 10 will be invariant in frequency and amplitude.

The balanced phase detector or phase discriminator 8 comprises a diplexer 12 operating at 825 mc., two matching sections 15 and 16, and two diode rectifier-detectors 17 and 18. These parts of the balanced phase discriminator 8 are substantially similar to corresponding parts comprising the balanced phase detector in the frequency control system of my joint copending application, Serial No. 130,964, filed December 3, 1949, and are described in considerable detail therein. Said joint copending application issued as Patent No. 2,676,260 on April 20, 1954.

Transmission line 7 is connected to one input of diplexer 12 and serves to couple energy from the amplitude modulated magnetron oscillator 1 to such diplexer, as one of the two diplexer inputs. Transmission line 9 is connected to the other input of diplexer 12 and serves to couple energy from the reference oscillator 10 (through frequency multiplier chain 11) to such diplexer, as the other of the two diplexer inputs. Diplexer 12 serves to make the electrical coupling between the reference signal and amplitude modulated oscillator signal negligible, while at the same time providing push-pull (antiphasal) and push-push (cophasal) inputs to the diode rectifier-detectors 17 and 18. The diplexer 12 may, for example, be of the type disclosed in Brown Patent No. 2,454,907, dated November 30, 1948, and also disclosed in the aforementioned copending joint application. There is a balancing device in the diplexer; this balancing device, called a balun, causes the signal from the transmitter oscillator 1 appearing at one of the two output leads or transmission lines 19 to be 180° out of phase (in push-pull) with the transmitter signal appearing at the other output lead or transmission line 20. The reference signal (from frequency multiplier chain 11), however, feeds the outputs 19 and 20 in parallel and hence in phase (push-push) with each other.

There are alternative arrangements of the diplexer 12. For example, the diplexer 12 may be replaced by other types of hybrid junctions such as a ring type or a "magic T," as illustrated in Figs. 4 and 5, respectively, of said copending joint application.

Diplexer output line 19 applies output from diplexer 12 to an impedance matching section 15, while diplexer output line 20 applies output from said diplexer to an impedance matching section 16. The matching sections 15 and 16 are quarter-wave-transformer-type inner and outer line conductor elements designed to match over a wide frequency range the 32-db standing wave ratio presented by the diodes 17 and 18 and their holders. In order to enable adjustment of the impedance of these sections, they are so constructed that the inner quarter-wave line section can be varied eccentrically with respect to the outer line section.

The output of matching section 15 is fed by means of a transmission line 21 to the diode rectifier-detector 17, while the output of matching section 16 is fed by means of a transmission line 22 to an exactly similar diode rectifier-detector 18. The diodes may be pencil-type vacuum tube diodes, of developmental type R–6367–C, and may be similar to those disclosed in the aforementioned joint copending application. Each diode is mounted in a holder 23 which has a built-in R. F. by-pass condenser 24. The two diodes 17 and 18 have respective load resistors 25 (and an adjustable portion of 26) and 27 (and the remaining portion of 26). The resistor 26 is made adjustable over a small range to afford final balance of the two diode outputs.

For the purpose of stabilizing the oscillator frequency, the crystal oscillator 10, which may include one or more multiplier stages, not shown, feeds wave energy of stable frequency through a phase modulator 28 (to be later described in more detail) to the input side of a frequency multiplier chain 29. This chain has a multiplication factor such that the energy appearing in the output line 30 of this multiplier chain has a frequency equal to the nominal operating frequency of magnetron 1, which in the example is 825 mc. The output of frequency multiplier chain 29 is fed by coaxial line 30 through the R. F. circuits 31 to a coaxial transmission line 32 which is coupled to the output line 6 of the magnetron 1, at a point between the magnetron 1 and the load 5. The R. F. circuits 31 generally may include stub tuners and "line-stretchers" for providing proper injection of the wave output of frequency multiplier chain 29 into the magetron output line 6, and consequently into the magnetron 1 itself.

When a magnetron oscillator such as 1 is anode modulated and locked to an injection source, during the modulation process angular modulation (e. g., phase modulation) is imposed to some extent on the modulated oscillator. This phase modulation is a consequence of R. F. phase differences between the controlled oscillator signal and the locking or injection signal, primarily due to the "pushing" frequency change effect resulting from the amplitude modulation of the magetron oscillator. In other words, dynamic phase differences between the oscillator and the injection source arise because of the fact that certain oscillators, more particularly magnetrons, are subject to "pushing," which results in phase changes in the oscillator output as the amplitude of the output changes due to modulation.

By means of the arrangement including oscillator 10 and elements 28—32, a phase modulated locking signal may be injected into the magnetron 1. By applying the output of the phase discriminator 8 to the phase modulator 28, and by so polarizing the output connections of the phase discriminator that the phase modulation produced in the injection transmission line 32 is 180° out of phase with the disturbing phase modulation appearing in the output of oscillator 1 at load 5, a negative feedback loop is established which will reduce the phase distortion (incidental phase modulation) in the modulated oscillator 1 output. In the phase discriminator 8, the output of the magnetron oscillator 1 is compared as to phase with the multiplied output of oscillator 10 (derived from frequency multiplier chain 11). The output of this discriminator will contain phase distortion components (incidental phase modulation appearing on the oscillator 1 output) but no amplitude modulation components. In addition, the output of the phase discriminator may contain direct voltages which are the result of slow frequency drifts occurring in the multipliers 11 and 29, in the magnetron 1, or elsewhere. For a more detailed description of the above operation, reference may be had to the aforementioned Koros application, Serial No. 249,507. In the said Koros application, the phase discriminator is A. C.-coupled to the phase modulator, so that the injection locking system of such application includes an A. C.-coupled phase discriminator and phase modulator feedback loop, this coupling being incapable of passing direct current.

According to the present invention, a D. C. coupling is used between the output of phase discriminator 8 and the phase modulator 28, so as to pass, in addition to the A. C. components, any direct voltages which appear in the output of the phase discriminator 8. In this way, very real and important advantages can be obtained.

The output of phase discriminator 8 is taken therefrom by means of three leads numbered 13, 14 and 33. Lead 13 is connected to the rectifier end of resistor 27, lead 14 is connected to the rectifier end of resistor 25, while lead 33 is connected to the grounded tap on resistor 26. Leads 13, 14 and 33 serve as the input connections for a D. C. and video amplifier 34 having a push-pull input and which may be termed a differential amplifier. The amplifier 34 may be substantially exactly like that disclosed in my copending sole application, Serial No. 353,652, filed May 7, 1953, now Patent No. 2,726,367, dated December 6, 1955, in which patent the detailed circuitry for the amplifier is disclosed in Fig. 1*b*. By way of brief description, and in accordance with the disclosure in my said sole application, the amplifier 34 may comprise three cascaded push-pull amplifying vacuum tube stages, the interstage couplings including glow tubes (which are capable of passing D. C.) in parallel with capacitors which are capable of passing alternating currents. Common cathode resistors, equal in number to the number of amplifying stages (three) are respectively utilized for the two push-pull tubes of each amplifying stage. Negative feedback is utilized from the anode of each third-stage tube to the anode of the first-stage tube on the opposite (push-pull) side. Then, the voltage between leads 13 and 33 (ground) of the present application may correspond to that denoted by $E_B$ in the aforementioned sole application and is fed to the input grid of one push-pull tube of the first amplifying stage of amplifier 34, while the voltage between leads 14 and 33 (ground) of the present application may correspond to that denoted by $E_A$ in said sole application and is fed to the input grid of the other push-pull tube of the first amplifying stage of said amplifier. The D. C. and video amplifier 34 is D. C. coupled, is capable of passing direct current and also alternating current, and may have a flat frequency response from D. C. (zero frequency) to the highest video frequency of interest, such as 5 mc. or 10 mc.

The output of amplifier 34 is taken single-ended from the anode of one of the tubes 35 of the third amplifying stage in this amplifier and is fed to a resistance-capacitance (RC) amplitude-response-shaping or amplitude correcting network 36 which reduces the overall gain of the feedback loop at higher frequencies, thus allowing most negative feedback to occur at lower frequencies. The output of network 36 goes to a potential-changing D. C. coupling device, illustrated as a battery 37 shunted for high frequency signals by a capacitor 38 of 1 microfarad, for example. The arrangement 37, 38 constitutes means for D. C. coupling the output of amplifier 34 to another device (phase modulator 28) requiring a different average D. C. potential from that of the amplifier. Alternatively, the arrangement 37, 38, instead of including a battery, could be a glow tube-condenser arrangement of the type disclosed in my aforementioned joint application, Serial No. 130,964, now Patent No. 2,676,260.

The output side of the arrangement 37—38 is coupled by way of a coaxial line connection 39 and an R. F. choke 40 to the suppressor grid of an amplifier tube 41 in a frequency multiplier 42 which constitutes a part of the phase modulator 28. Modulator 28 includes two frequency multipliers 42 and 43 both supplied from crystal oscillator 10. The outputs of the multipliers 42 and 43 are combined vectorially at point 44, the output of multiplier 42 being in phase quadrature at point 44 with the output of multiplier 43 and this quadrature relation being indicated by the transmission line loop 45. Multipliers 42 and 43 can thus both include tubes operating as class C amplifiers supplied with carrier energy excitation from unit 10 and tube 41 being amplitude modulated by the voltage supplied to its suppressor grid from phase discriminator 8. The gain of tube 41 is thus varied in response to the output voltage of discriminator 8, amplified through amplifier 34, to vary the amount of quadrature energy appearing at point 44. This results, because of the vectorial addition at this latter point, in variation or modulation of the phase of the resultant wave appearing at the output 44 of phase modulator 28.

Because of the D. C. couplings capable of passing direct current all the way through, from the output of phase discriminator 8 to the suppressor grid of tube 41, the output of discriminator 8, both D. C. and A. C., is used as a modulating signal for phase modulator 28. All the various component frequencies (both A. C. and D. C., from zero frequency or D. C. clear on up to video frequencies) which appear in the output of discriminator 8 can be effective on, or can be applied to, the phase modulator 28.

A connection extends from the phase modulator output or combining point 44 to the input side of the frequency multiplier chain 29, so as to feed phase-modulated wave energy of stable frequency (derived from crystal oscillator 10) to unit 29. Even though the phase deviation produced by modulator 28 may be small, this deviation is multiplied up by unit 29 to an optimum high value.

Thus, all of the various component frequencies, including D. C. components, appearing in the output of discriminator 8, will phase modulate the injection voltage fed from oscillator 10 through phase modulator 28 and frequency multiplier chain 29 to the injection branch transmission line 32.

The operation of the arrangement of this invention will now be explained. The phase of the sample signal from the magnetron output line 6 is compared to that of the coherent, stable reference signal (from oscillator 10 by way of multipliers 11) in the phase discriminator 8. The term "coherent" means that the reference signal fed to the discriminator 8 and the injection signal fed to the line 6 are both derived from the same crystal-controlled source 10. If the two signals are not at the proper equilibrium phase relationship, the error signal (D. C. or A. C. or both) from the discriminator output is amplified in the D. C. amplifier 34 and fed to the phase modulator 28 to cause corresponding phase modulation of the injected locking signal, reducing the phase error of the magnetron in accordance with the gain of the feedback loop. This process reduces the A. C. phase modulation of the signal present in the load 5. Also, any slow frequency drifts anywhere in the system, including the multpliers 11, the multipliers 29, and the magnetron 1, as well as other components of the system, which might tend to cause the static phase relationship between the two signals fed to the phase discriminator 8 to vary from its proper value (the value at which the magnetron oscillator R. F. carrier is approximately centered on the phase discriminator characteristic), produce D. C. components in the phase discriminator output. These D. C. components pass through the D. C. amplifier 34 and the D. C. coupling device 37—38 and are also applied to the phase modulator, resulting in degeneration of such drifts in the oscillator 1 output and thereby automatically maintaining the proper static phase relationship between the two signals fed to the discriminator 8. Thus, by means of this invention the magnetron oscillator R. F. carrier is automatically maintained approximately centered on the phase discriminator characteristic, as desired.

This invention is not limited to the "injection-locking" arrangement described. For example, the output transmission line 30 could be coupled to "FM guns" provided in the magnetron oscillator, somewhat as in the aforementioned joint application, Serial No. 130,964, now Patent No. 2,676,260. In other words, the elements 31 and 32 could be replaced by a suitable arrangement operating on "FM guns." In this case, an additional feedback loop arrangement, substantially exactly similar to that disclosed in my said joint application, could be connected between the magnetron output line 6 and the "FM guns" of the magnetron.

When amplitude modulation of a power amplifier takes place, quite often undesired incidental phase modulation also occurs, and it is within the scope of this invention to reduce such incidental phase modulation. In other words, the invention is applicable to a modulated power amplifier, as well as to an oscillator. In this case, the controlled phase modulator 28 would be inserted in the connections between the crystal oscillator (which supplies R. F. or carrier excitation energy to the modulated power amplifier) and the modulated power amplifier, while the transmission line 7 would be coupled to the output of the modulated power amplifier and the transmission line 9 would be coupled to the output of an excitation-source-energized frequency multiplier chain 11.

What is claimed is:

1. In a frequency stabilization system for a source of modulated wave energy which energy may be subject to incidental phase modulation, a source of stable frequency waves, a coupling including a phase modulator between said second-named source and said first-named source, whereby phase modulated waves of stable frequency may be injected into said first-named source to lock the frequency thereof to the frequency of the second-named source, means for detecting the phase modulation present on the modulated wave energy output of said first-named source, and a coupling capable of passing direct current between the output of said means and said phase modulator, thereby to apply the direct current output of said means to said phase modulator as a modulating voltage therefor.

2. In a frequency stabilization system for an oscillator the output of which may be subject to incidental phase modulation, a source of stable frequency waves, a coupling including a phase modulator between said source and said oscillator, whereby phase modulated waves of stable frequency may be injected into said oscillator to lock the frequency thereof to the frequency of said source, means for detecting the phase modulation present on said oscillator output, and a coupling capable of passing direct current between the output of said means and said phase modulator, thereby to apply the direct current output of said means to said phase modulator as a modulating voltage therefor.

3. A system in accordance with claim 2, wherein the last-mentioned coupling includes a direct current amplifier.

4. A system in accordance with claim 2, wherein said means is a phase discriminator and wherein the last-mentioned coupling includes a direct current amplifier.

5. In a frequency stabilization system for an oscillator the output of which may be subject to incidental phase modulation, a source of stable frequency waves, a coupling including a phase modulator between said source and said oscillator, whereby phase modulated waves of stable frequency may be injected into said oscillator to lock the frequency thereof to the frequency of said source, means for comparing the phases of the oscillator output wave and of a wave derived from said source and for developing voltages representative of phase differences between the compared waves, and a coupling capable of passing direct current between the output of said means and said phase modulator.

6. A system in accordance with claim 5, wherein the last-mentioned coupling includes a direct current amplifier.

7. A system in accordance with claim 5, wherein said means is a balanced phase discriminator and wherein the last-mentioned coupling includes a direct current amplifier.

8. In a frequency stabilization system for an oscillator the output of which may be subject to incidental phase modulation, a source of stable frequency waves, a coupling including a phase modulator between said source and said oscillator, whereby phase modulated waves of stable frequency may be injected into said oscillator to lock the frequency thereof to the frequency of said source, a phase discriminator having a pair of inputs and an output, means coupling output energy from said oscillator to one of said inputs, means coupling a wave derived from said source to the other of said inputs, and a coupling capable of passing direct current between said output and said phase modulator.

9. In a frequency stabilization system for an oscillator the output of which may be subject to incidental phase modulation, a source of stable frequency waves, a coupling including a phase modulator between said source and said oscillator, whereby phase modulated waves of stable frequency may be injected into said oscillator to lock the frequency of said oscillator to the frequency of said source, a balanced phase discriminator having a pair of inputs and a push-pull output, means coupling output energy from said oscillator to one of said inputs, means coupling a wave derived from said source to the other of said inputs, and a coupling capable of passing direct current between said output and said phase modulator.

10. A system in accordance with claim 9, wherein the last-mentioned coupling includes a direct current amplifier having a push-pull input circuit coupled to said push-pull output.

11. A system in accordance with claim 9, wherein the last-mentioned coupling includes a direct current amplifier having a push-pull input circuit coupled to said push-pull output, wherein the first-mentioned coupling includes also frequency multiplier means between the phase modulator and the oscillator, and wherein the last-mentioned means includes frequency multiplier means between the source and said other input.

References Cited in the file of this patent

UNITED STATES PATENTS

| | | |
|---|---|---|
| 2,298,930 | Decino | Oct. 13, 1942 |
| 2,501,355 | Pratt | Mar. 21, 1950 |
| 2,620,467 | Donal | Dec. 2, 1952 |